2,759,934
Patented Aug. 21, 1956

2,759,934

DIALKYLAMINOALKYLAMIDES

Merrill Eugene Speeter, Kalamazoo, Mich., assignor to Bristol Laboratories Inc., Syracuse, N. Y., a corporation of New York No Drawing. Application February 18, 1953,
Serial No. 337,660

5 Claims. (Cl. 260—247.2)

This invention relates to a new class of organic compounds and to methods for the preparation thereof. More particularly, this invention relates to a series of basically substituted amides of ortho-benzylphenyl-acetic acid.

The new compounds of the present invention are the free bases, the acid addition salts and the quaternary salts of the bases which may be represented by the following general formula:

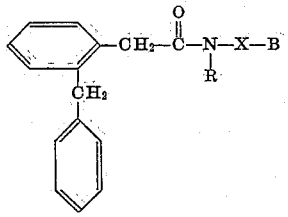

wherein X represents straight and branched chain, bivalent alkylene radicals containing from two to six carbon atoms inclusive; B represents a member selected from the group consisting of piperidino, morpholino, pyrrolidino, (lower)alkylpyrrolidino, N'-alkylpiperazino, pipecolino and di(lower)alkylamino; and R represents a member selected from the group consisting of hydrogen and lower alkyl.

The compounds of this invention possess useful activity as anti-spasmodic and analgesic agents. The free bases and acid addition salts are useful as intermediates in the preparation of the quaternary salts; the quaternary salts are useful as germicides and disinfectants.

The compounds of this invention may be prepared by reacting ortho-benzylphenylacetyl chloride with an appropriate tertiary-amino-substituted aliphatic primary or secondary amine and recovering the substituted amide.

The following examples will serve to illustrate the invention without limiting it thereto. All temperatures are centigrade.

EXAMPLE I

Ortho-benzylbenzyl chloride

Ortho-benzylbenzyl alcohol is prepared as the starting reagent. A solution of lithium aluminum hydride is prepared in a three-necked flask equipped with a mechanical stirrer, using 5 grams (0.13 mole) of lithium aluminum hydride and 400 ml. of anhydrous ether. To this solution is added 26.5 grams (0.125 mole) of ortho-benzoylbenzoic acid dissolved in 300 ml. of ether. The mixture is refluxed three hours and cooled and dilute hydrochloric acid is added dropwise to the stirred mixture. The ether layer is separated and the water layer is extracted with 300 ml. of ether. The combined ether solutions are dried over potassium carbonate and concentrated. The remaining oil is distilled under reduced pressure and the ortho-benzylbenzyl alcohol is collected at about a range of 148–151° C. at 3 mm.

Analysis.—Calculated for C14H14O: C 85.25; H 7.12. Found: C 85.54; H 7.27.

One gram of the alcohol is converted to a solid urethane derivative by refluxing it with one gram of phenyl isocyanate in 25 ml. of benzene for eighteen hours. The solution is diluted with 50 ml. of Skellysolve C and cooled. The crystals which separate are found to melt at about 77–78° C. after recrystallization from Skellysolve C.

Analysis.—Calculated for C21H19NO2: C 79.60; H 6.04. Found: C 79.68; H 6.24.

Ortho-benzylbenzyl alcohol, 58 g., is placed in a 500 ml. flask and 150 ml. of thionyl chloride added dropwise. A few drops of pyridine is added and the mixture refluxed for four hours. The excess thionyl chloride is removed under slightly reduced pressure and the residue is vacuum distilled. Ortho-benzylbenzyl chloride boiling at 145–155°/3 mm. is obtained.

Analysis.—Calculated for C14H13Cl: C 77.59; H 6.04. Found: C 77.24; H 6.26.

EXAMPLE II

Ortho-benzylphenylacetic acid

Using a nitrogen atmosphere and mechanical stirring a solution of 70 g. (0.32 mole) of ortho-benzylbenzyl chloride in 250 ml. of ether is added dropwise to 23 g. (1 g. atom) of magnesium. The reaction starts promptly. After all the halide has been introduced the mixture is refluxed 45 minutes. The Grignard reagent is poured slowly onto 200 g. of powdered solid carbon dioxide which has been layered with ether. After all the carbon dioxide has vaporized, the mixture is placed in an ice-bath and dilute sulfuric acid is added cautiously. The ether layer is separated and the water layer extracted several times with 200 ml. portions of ether. The combined ether solutions are washed with dilute sodium hydroxide. The basic extracts give a heavy oil on acidification which soon solidifies. The acid melts at 94–96° after two recrystallizations from petroleum ether (B. P. 88.5–100°).

Analysis.—Calculated for C15H14O2: C 79.71; H 6.23. Found: C 79.50; H 6.55.

EXAMPLE III

N-beta-morpholinylethyl-ortho-benzylphenylacetamide

Fourteen g. of ortho-benzylphenylacetyl chloride is added dropwise to a solution of 30 g. of beta-morpholinylethylamine in 300 ml. of benzene. The mixture is refluxed for four hours and poured into water. Dilute base is added and the benzene layer separated. The benzene layer is extracted with dilute hydrochloric acid and the acid extracts made basic. The oil liberated solidifies on cooling. The dried, solid N-beta-morpholinylethyl ortho-benzylphenylacetamide is recrystallized from petroleum ether (B. P. 85.5°–100°) M. P. 114–116°.

Analysis.—Calculated for C21H26N2O2: C 74.53; H 7.74. Found: C 74.80; H 8.17.

In cases where the free base of the product does not crystallize spontaneously, it may be purified and separated from the original, basic reagent amine by distillation in vacuo.

Ten grams of methyl iodide is added to ten grams of the amide in 150 ml. of isopropyl alcohol. The mixture is placed in a pressure bottle, warmed thirty minutes on the steam bath, cooled and allowed to stand for eighteen hours to produce beta-morpholinylethyl ortho-benzylphenylacetamide methiodide. Treatment of the amide with hydrogen bromide forms the hydrobromide acid addition salt.

EXAMPLE IV

N-methyl-N-dimethylaminoethyl-ortho-benzylphenylacetamide

The procedure of Example 3 is carried out, replacing the morpholinylethylamine with an equimolar quantity of N-methyl-dimethylaminoethylamine, to produce N-methyl - N - dimethyl-aminoethyl-ortho-benzylphenylacetamide, which is purified by distillation in high vacuum. This free base is converted into quaternary and acid addition salts by the method of Example 3 using ethyl iodide and citric acid respectively.

The invention also contemplates the organic and inorganic acid addition salts of the compounds having the general formula above such as will be readily formed with, for example, organic and inorganic acids such as hydrochloric, sulfuric, sulfamic, tartaric, hydrobromic, hydriodic, glycolic, citric, maleic, phosphoric, succinic, acetic, benzoic, cinnamic, mandelic, malic, ascorbic, and the like. The method of preparation of these salts is made apparent in the examples above.

This invention also contemplates the quaternary salts of the free bases of the general formula above, which may be prepared as made apparent in the examples above by the treatment of the free bases with quaternary salt-forming substances. These quaternary salt-forming substances include methyl chloride, methyl bromide, methyl iodide, ethyl chloride, ethyl bromide, ethyl iodide, n-propyl chloride, n-propyl bromide, n-propyl iodide, isopropyl bromide, n-butyl chloride, n-butyl bromide, isobutyl bromide, sec.-butyl bromide, n-amyl bromide, n-hexyl chloride, benzylchloride, benzyl bromide, methyl sulfate, ethyl sulfate, methyl benzenesulfonate, methyl p-toluenesulfonate, etc. which will react directly with any free base of the general formula above to give respectively the methochloride, methobromide, methiodide, ethochloride, ethobromide, ethiodide, n-propochloride, n-propobromide, n-propiodide, isopropobromide, n-butochloride, n-butobromide, isobutobromide, sec.-butobromide, n-amobromide, n - hexochloride, benzochloride, benzobromide, methosulfate, ethosulfate, methobenzenesulfonate, metho-p-toluenesulfonate, etc.

The acid chloride of ortho-benzylphenylacetic acid is reacted according to the procedure of Example III with equimolar amounts of 5-(di-n-propylamino)-1-aminopentane, 5-(di-n-propylamino)-1-methylaminopentane, beta-(diethylamino)isopropylamine, N - methyl-beta(diethylamino)isopropylamine, beta - 1 - alpha-pipecolylethylamine, N - n - propyl - beta - (1 - alpha-pipecolyl)ethylamine, 3-(1 - gamma-pipecolyl)-1-aminopropane, 3 - (1 - gamma-pipecolyl)-1-isopropylaminopropane, beta-1-pyrrolidylethylamine, N - n - butyl - beta-1-pyrrolidylethylamine, beta-dimethylamino-n-butylamine, N - n - amyl - beta-dimethylamino-n-butylamine, 3-(ethylmethylamino) - 1 - aminopropane, 3 - (ethylmethylamino) - 1 - n - hexylaminopropane, beta - dipropyl-aminoethylamine, N - isohexyl-beta-dipropylaminoethyl-amine, 6-(dimethylamino)-1-aminohexane, beta-piperidyl-ethylamine, and 1-(4-methylpiperazyl)-4-aminobutane respectively to produce N-5-di-n-propylamino-1-pentyl-ortho-benzylphenylacetamide, N-methyl-N-5-di-n-propyl-amino-1-pentyl-ortho-benzylphenylacetamide, N-beta(diethylamino)isopropyl - ortho-benzylphenylacetamide, N-ethyl-N-beta(diethylamino)isopropyl-ortho-benzylphenyl-acetamide, N-beta-(1-alpha-pipecolyl)ethyl-ortho-benzyl-phenylacetamide, N-n-propyl-N-beta-(1-alpha-pipecolyl)-ethyl-ortho-benzylphenylacetamide, N-gamma-(1-gamma-pipecolyl)propyl-ortho-benzylphenylacetamide, N-isopropyl - N-gamma-(1-gamma-pipecolyl)propyl-ortho-benzyl-phenylacetamide, N-beta-(1-pyrrolidyl)ethyl-ortho-ben-zylphenylacetamide, N - n - butyl-N-beta-(1-pyrrolidyl)-ethyl - ortho - benzylphenylacetamide, N-beta-(dimethyl-amino)-n-butyl-ortho-benzylphenylacetamide, N-n-amyl-N - beta - (dimethylamino)-n-butyl-ortho-benzylphenyl-acetamide, N-gamma(ethylmethylamino)-n-propyl-ortho-benzylphenylacetamide, N-n-hexyl-N-gamma(ethylmeth-ylamino)-n-propyl-ortho-benzylphenylacetamide, N-beta-dipropylamino)ethyl-ortho-benzylphenylacetamide, N-iso-hexyl - N-beta(dipropylamino)ethyl-ortho-benzylphenyl-acetamide, N-6-(dimethyl-amino)-n-hexyl-ortho-benzyl-phenylacetamide, N - beta - piperidylethyl-ortho-benzyl-phenylacetamide, and N-4-(4'-methylpiperazyl)-n-butyl-ortho-benzylphenylacetamide, respectively.

In general the salts are soluble in water and constitute a preferred form of the invention. The organic bases, on the other hand, are generally water-insoluble, but soluble in simple organic solvents such as alcohols, ethers, hydrocarbons and lower ketones.

I claim:

1. A member selected from the group consisting of compounds having the structure

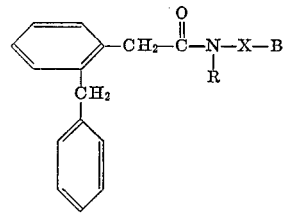

wherein X represents a bivalent alkylene radical containing from two to six carbon atoms inclusive, B represents a member selected from the group consisting of piperidino, morpholino, pyrrolidino, N'-alkylpiperazino, pipecolino and di(lower)alkylamino and R represents a member selected from the group consisting of hydrogen and lower alkyl; and acid addition salts and quaternary salts of said compounds.

2. A member selected from the group consisting of beta-morpholinylethyl-ortho-benzyl-phenylacetamide and acid addition and quaternary salts thereof.

3. A member selected from the group consisting of N - methyl - N - dimethylaminoethyl-ortho-benzylphenyl-acetamide and acid addition and quaternary salts thereof.

4. A member selected from the group consisting of N - beta-piperidylethyl-ortho-benzylphenylacetamide and acid addition and quaternary salts thereof.

5. The process of reacting ortho-benzylphenylacetyl chlorides with tertiary-amino-substituted aliphatic primary and secondary amines and recovering a compound having the structure

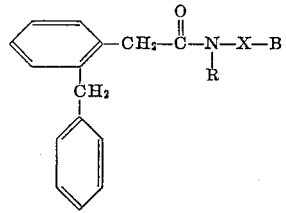

wherein X represents straight and branched chain, bivalent alkylene radicals containing from two to six carbon atoms inclusive, B represents a member selected from the group consisting of piperidino, morpholino, pyrrolidino, N'-alkylpiperazino, pipecolino and di(lower)alkyl-amino and R represents a member selected from the group consisting of hydrogen and lower alkyl.

References Cited in the file of this patent
UNITED STATES PATENTS

| | | |
|---|---|---|
| 2,009,144 | Miescher et al. | July 23, 1935 |
| 2,629,736 | Krimmel | Feb. 24, 1953 |
| 2,629,737 | Krimmel | Feb. 24, 1953 |
| 2,634,274 | Krimmel | Apr. 7, 1953 |